United States Patent [19]

Picker

[11] E Re. 29,620

[45] Reissued May 2, 1978

[54] SELF-MONITORED FLUID PRESSURE BOOSTER SYSTEM

[75] Inventor: Franck Picker, Oak Ridge, Tenn.

[73] Assignee: Oak Ridge Machines, Oak Ridge, Tenn.

[21] Appl. No.: 702,236

[22] Filed: Jul. 2, 1976

Related U.S. Patent Documents

Reissue of:

[64] Patent No.: 3,928,969
Issued: Dec. 30, 1975
Appl. No.: 473,217
Filed: May 24, 1974

[51] Int. Cl.[2] ..... F15B 15/18

[52] U.S. Cl. ..... 60/428; 60/430; 60/468; 91/29; 91/412

[58] Field of Search ..... 60/428, 429, 430, 468, 60/DIG. 10; 91/28, 29, 61, 412, 451, 468; 417/287; 137/99, 115; 251/23, 36, 47

[56] References Cited

U.S. PATENT DOCUMENTS

| | | | |
|---|---|---|---|
| 1,839,144 | 12/1931 | Flagg | 251/36 X |
| 2,388,877 | 11/1945 | Souter | 60/DIG. 10 |
| 2,802,452 | 8/1957 | Hogeman | 91/61 X |
| 2,845,868 | 8/1958 | Norlin | 60/428 |
| 3,385,217 | 5/1968 | Bles | 417/287 |
| 3,386,340 | 6/1968 | Engle | 91/61 |
| 3,495,804 | 2/1970 | Müller et al. | 251/36 |

FOREIGN PATENT DOCUMENTS

| | | | |
|---|---|---|---|
| 2,001,387 | 8/1971 | Germany | 60/413 |
| 1,750,236 | 4/1971 | Germany. | |

*Primary Examiner*—Edgar W. Geoghegan
*Attorney, Agent, or Firm*—Stevens, Davis, Miller & Mosher

[57] ABSTRACT

A booster for a fluid pressure operated system in which relatively low pressure is used in the system and the booster is designed to be positioned immediately adjacent the fluid operated mechanism so as to eliminate the need for high pressure fittings and components. The booster has a spool which is shiftable in response to pressure build up in the mechanism. The spool acts as a sliding valve to direct fluid flow through a pressure converter such as a turbine or volumetric motor-pump located inside the spool.

26 Claims, 9 Drawing Figures

SELF-MONITORED FLUID PRESSURE BOOSTER SYSTEM

Matter enclosed in heavy brackets [ ] appears in the original patent but forms no part of this reissue specification; matter printed in italics indicates the additions made by reissue.

This invention relates to the field of fluid pressure operated devices, particularly hydraulically operated tools, arms, motors, etc. It particularly pertains to a device for "on the spot" boosting of hydraulic pressure so that an entire system does not need to be maintained at a high pressure which is only needed at the point of operation of a fluid pressure operated mechanism.

In many applications of fluid pressure operated mechanisms it is necessary to apply a relatively low pressure during part of the operation and a relatively high pressure for a shorter period during the operation. The relatively high pressure can be obtained from a separate source of pressure, by maintaining the entire system at the higher pressure, or by a pressure booster which operates only when the higher pressure is needed. Generally speaking there has been a tendency to increase the fluid pressure used to operate various types of mechanisms, such as hydraulic cylinders or motors. For example, a pressure of 1,500 PSI was formerly considered to be high, but now it is not uncommon to have a pressure of 3,000 PSI or greater. This can lead to more compact components operating on a system with perhaps a smaller fluid reserve, but, it also leads to all of the components being more delicate, therefore more difficult and expensive to manufacture and requiring high quality maintenance.

Although increasingly sophisticated components, such as valves and multi-stage pumps are available for use with these higher pressures, there is some standard equipment which cannot be used at pressures above say about 2000 PSI, such as single stage gear pumps.

For installations where it is desirable to have a high volume-low pressure fluid flow in the initial stages of movement and then, as the load increases, to have a high pressure fluid which can be utilized at a lower volume flow, various types of pressure boosters are used as accessories in a basic hydraulic system, requiring specialized and expensive components in the high pressure portion thereof. Such mixed systems have generally not proved very satisfactory and often after a partial conversion a system owner may conclude it would be better to start over with a complete high pressure system despite the disadvantages described above. There is thus a need for a better means to enable utilization of relatively low pressure throughout a system except at the very point of pressure consumption, eliminating the need for high pressure valves and fittings between the booster and consuming device and permitting the use of components comparable in size or even smaller than those used in high pressure systems. Similarly such a pressure booster should be self-monitoring that is, to become actuated only when the higher pressure is required and to permit free flow through under lower (unboosted) pressure when not needed.

It is thus an object of the present invention to provide an integrated self-monitored fluid pressure booster device or system which is more compact than existing systems and can be mounted immediately adjacent the fluid operated mechanism so as to eliminate the need for high pressure parts between the booster and the mechanism.

It is further an object to provide a device in which the unobstructed full flow of fluid is available to feed a mechanism when boosted pressure is not required but to automatically provide higher pressure when needed by the mechanism.

In order to describe a preferred embodiment the remainder of this description will be directed to the construction and use of a self-monitored fluid pressure booster which is adapted to be secured directly to the end of a hydraulic cylinder or ram, for example, a ram which would be used to travel a relatively long distance in which little resistance was encountered, such as one which is used to cut an automobile body in two but would meet with high resistance, and require high pressure, only in the last few inches of travel near the end of the stroke.

This preferred embodiment will now be described in connection with the attached figures of drawings which are furnished by way of example and not limitation in which further advantages and objects will become apparent:

Figure 1:
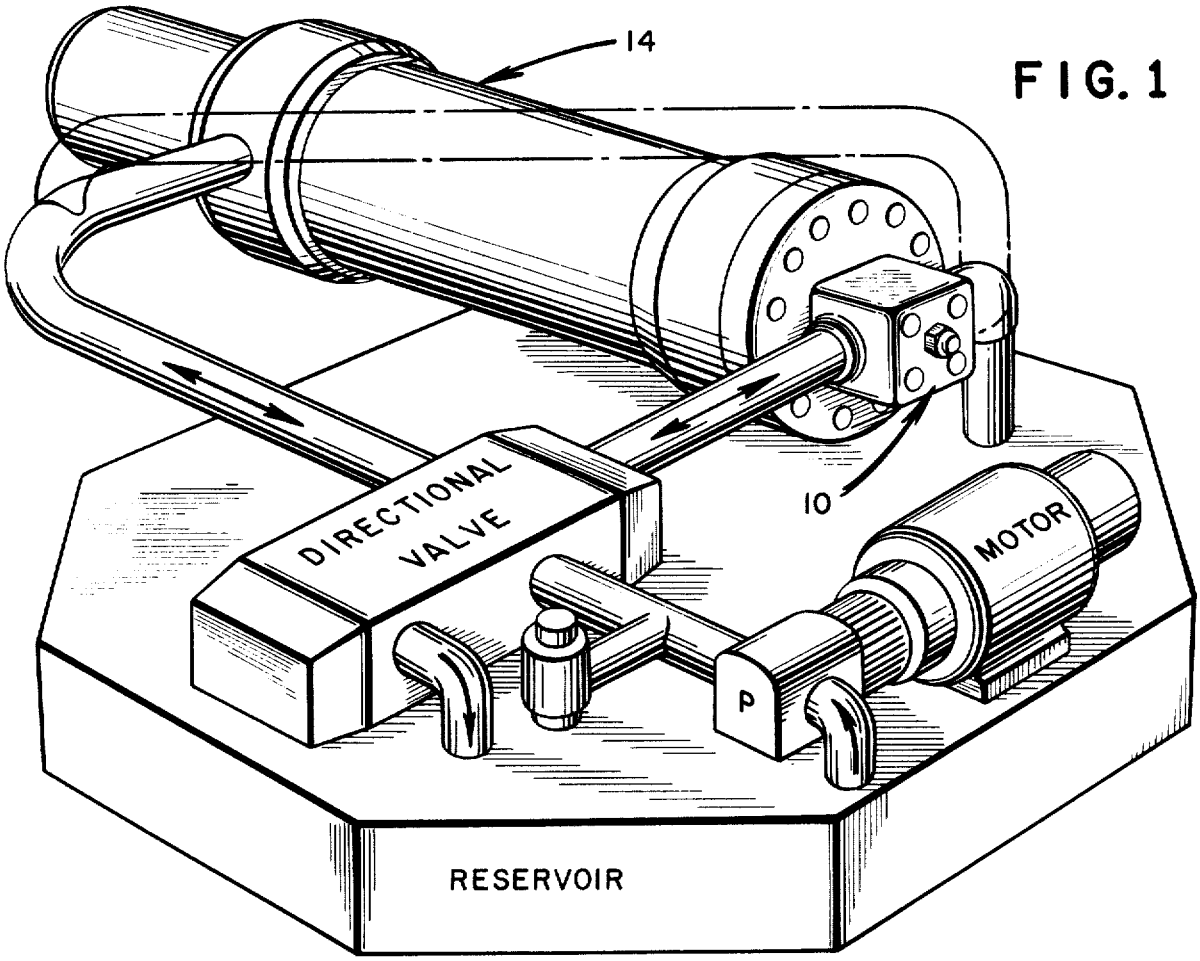
FIG. 1 is a perspective overall view of a hydraulic system showing the booster of this invention at one end of a hydraulic cylinder.

Turning now to the drawings in greater detail, FIG. 1 illustrates a generally conventional hydraulic cylinder and actuating circuit having a reservoir to hold the fluid, a motor to drive a pump P to force fluid under pressure into a directional valve where it can be shifted to actuate the piston either inwardly or outwardly in relation to its cylinder. At the end of the cylinder is mounted the booster 10 which is the object of the present invention.

Figure 2:
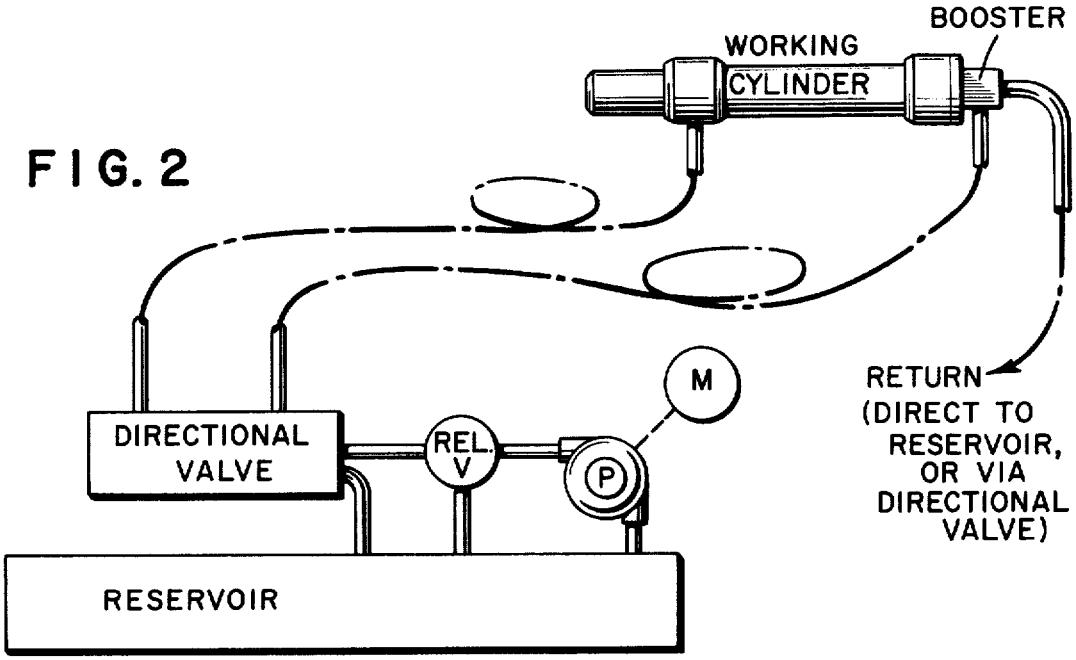
FIG. 2 is a schematic representation of the system shown in FIG. 1.

FIG. 2 illustrates a setup similar to that of FIG. 1 but where the working cylinder and booster are located at a distance from the reservoir, pump and directional valve, usually by means of flexible hoses. In such a setup it is, of course, desirable to expose the flexible hoses only to low pressure so as to not only preserve their life, but also to permit the use of less expensive hoses and connections.

Figure 3:
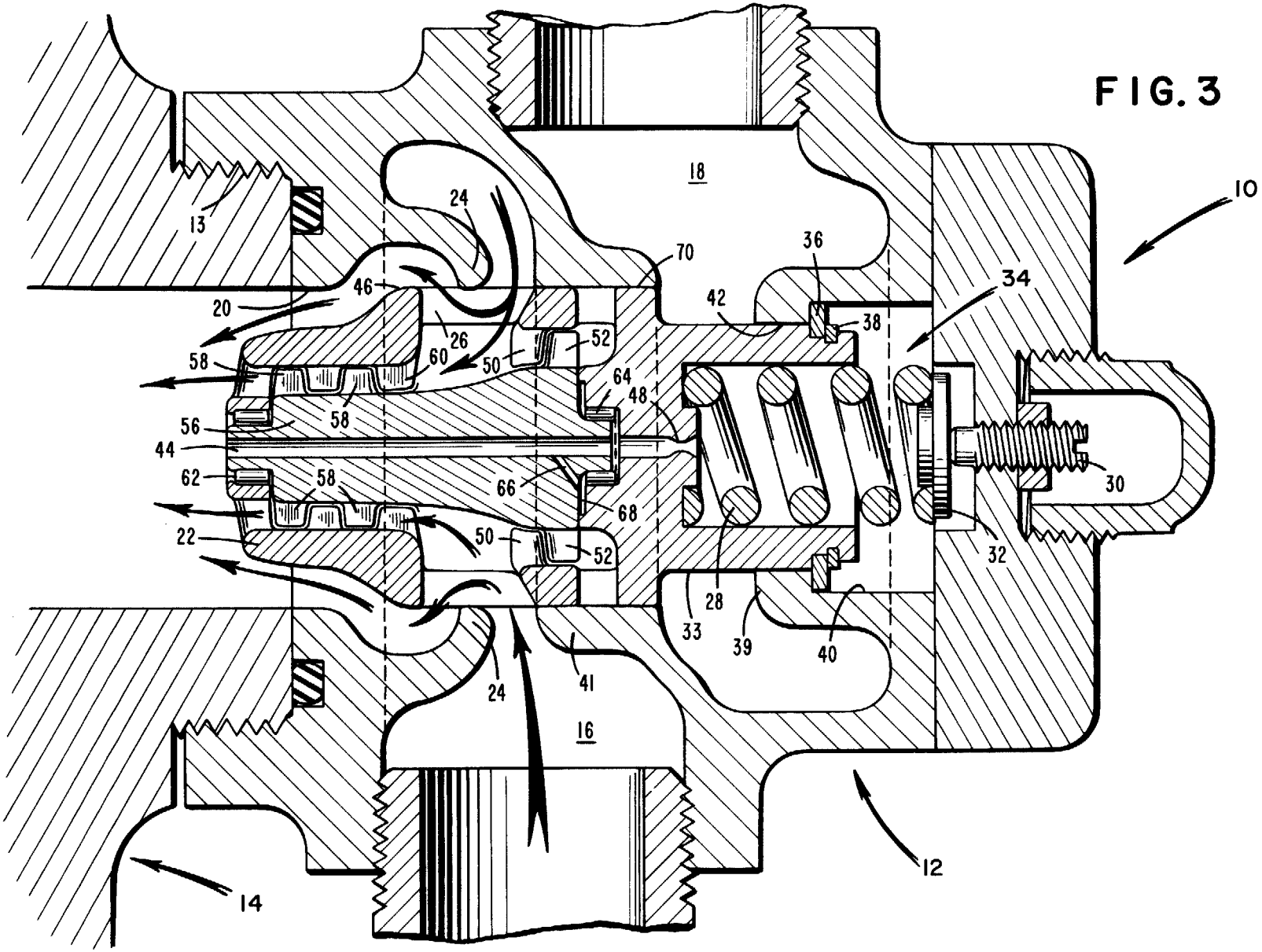
FIG. 3 is a sectional view through the booster of the present invention showing the use of an axial flow turbine and pump as the pressure converter, the converter being located in a shiftable spool which is illustrated to show the fluid flow by-passing the converter.

FIG. 3 shows only a portion of the hydraulic cylinder 14, that cylinder having a threaded portion 13 between the body 12 of the booster 10 and the cylinder. The body 12 has inlet port means 16 and outlet port means 18 each with a threaded hose or pipe connection in the outer portion thereof. The body has a bore 20 preferably centrally located with an axially shiftable spool 22 positioned therein. A series of webs in the body define annular flow passages in the body, these webs being axially positioned so as to define different flow paths either through or around the shiftable spool 22 depending upon the axial position of that spool. The spool and bore are machined with a close fitting tolerance between mating surfaces so that a substantially fluid-tight seal can be effected between them. The bore and spool are preferably circular in cross section. In FIG. 3 the web 24 is axially narrower than the inlet passage opening 26 of the shiftable spool, thus defining a by-pass flow path so that substantially all of the incoming fluid in port means 16 will flow directly into cylinder 14 rather than through spool 22 or into the outlet port means 18. In the position shown in FIG. 3 the outlet port means 18 is closed off from fluid flow because shoulder 70 of the spool contacts web 41 of the body.

Thus, the flow of fluid through the by-pass flow path as indicated by the arrows in FIG. 3 will continue until pressure begins to build up in the cylinder 14. When this pressure gets sufficiently high, the entire spool 22 will shift within the bore 20 to the right as illustrated in FIG. 3. The spool will then assume the position shown in FIG. 4 thus defining different flow paths for the fluid through the body. The effect of these flow paths will be discussed in connection with FIG. 4.

Figure 4:
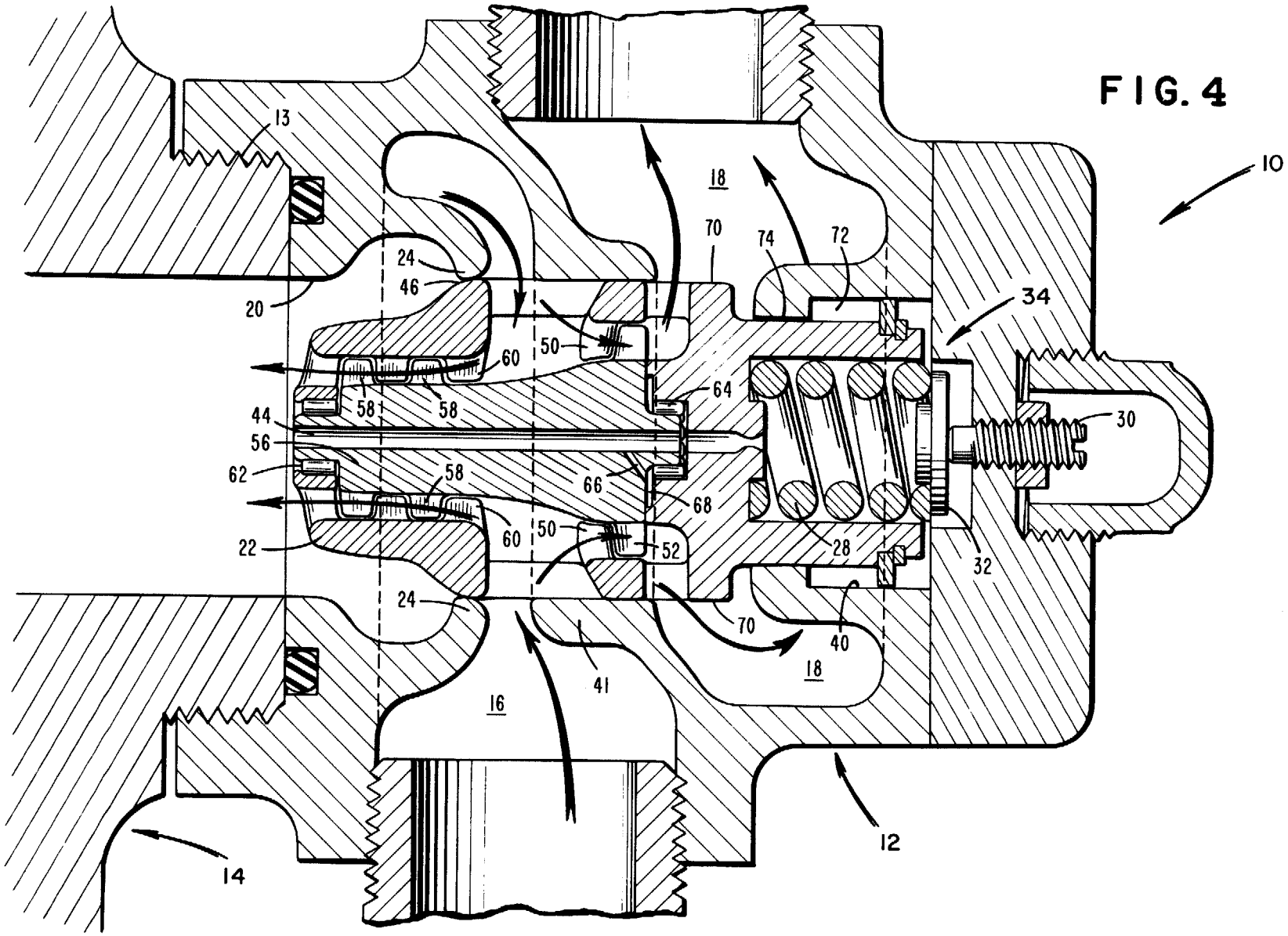
FIG. 4 is a sectional view similar to FIG. 3 but with a shiftable spool in a position where the fluid flow is directed through the pressure converter.

The shifting of the spool 22 is controlled by several factors. At the distal end of the spool is a return means, the present drawings illustrating a spring-dashpot arrangement. It is contemplated that the return means could be in a variety of forms including manual actuation, separate fluid operated means, or electromechanical devices. In the presently illustrated preferred embodiment a spring 28 is held in compression between an adjusting screw 30 and washer 32 and the end of the spool. The spring tends to bias the spool 22 toward the left in FIGS. 3 and 4. When the back pressure in the cylinder 14 becomes strong enough to overcome the effect of spring 28, the spool 22 will shift to the right as shown in FIG. 4 with the dashpot 34 acting to control the speed of the shifting movement so as to prevent hammering or rapid unstable shifting of the spool.

The dashpot 34 is defined by an annular web 39 presenting a cylinder wall 40 which is engaged by a cylinder ring 36 on an extension 33 of the spool, the ring 36 being held in place by a spring retainer ring 38. The opening 42 through which the extension 33 of the spool projects in slightly larger in diameter than that projection for reasons which will be explained in connection with FIG. 4. The amount of force required to shift spool 22 is controlled by several factors: the strength of spring 28, the fit of cylinder ring 36, and a passageway 44 extending through the center of the spool. Because of the passageway 44 the fluid pressure on both sides of the spool is equal, however, the area upon which that pressure is acting is unequal since the diameter at the spool at point 46 is greater than the diameter at cylinder ring 36. Thus the size of the return spring can be calculated as follows:

$$F \leqq (A_1 - A_2) P_1$$

where:

$F$ = force of spring $A_1$ = larger area of spool (at diameter 46)

$A_2$ = smaller area of spool (at cylinder ring 36)

$P_1$ = maximum pressure in inlet port means

The speed of the shifting of the spool is controlled by the size of the orifice 48 in passageway 44. When the spool shifts there will be a fluid flow through passageway 44 in a direction opposite to that of the spool; the speed of that flow (and consequently the speed of the shifting) is controlled by the size of orifice 48, a larger orifice leading to faster shifting.

When the back pressure in cylinder 14 becomes sufficiently high it will force the spool 22 to shift to assume the position illustrated in FIG. 4. In that position the fluid flow path is completely changed with web 24 fitting the shoulder 46 at maximum diameter of the spool 22 so as to force substantially all of the incoming fluid into the inlet passage 26 of the shifter with the shoulders 46 and 70 acting as means to control the fluid flow in the manner of a sliding valve. The incoming fluid flow will then be divided, part of it following the path of least resistance past stator vanes 50 which imparts a rotary motion to the fluid which in turn forces rotor blades 52 to rotate. This rotation causes the entire turbine rotor 56 to turn thus rotating turbine pump rotor blades 58 which are spaced between stator vanes 60. The interaction of the blades 58 and vanes 60 is that of an axial flow pump which forces part of the incoming fluid from inlet port 16 therethrough to emerge at considerably higher pressure into cylinder 14. This supplies the higher pressure required by the cylinder ram when it needs to exert maximum forces. The turbine rotor 56 is supported for rotary movement in sets of bearings, preferably roller bearings 62 and 64. Since the back pressure in cylinder 14 would tend to force rotor 56 toward bearings 64, a small pressure bleedoff passage 66 extends at an angle from passageway 44 so as to place an area 68 located between the rotor and the remainder of the spool at the boosted pressure thus holding the rotor in approximate longitudinal equilibrium. This can be achieved by controlling the size of area 68 in such a way that area 68 multiplied by the boosted pressure is equal to or larger than the total axial reaction force on rotor 44. As previously described, when the spool is shifted to the position shown in FIG. 4, the incoming fluid is split into two portions, one going through the pump vanes and blades 58–60 and the other through motor vanes and blades 50–52. Upon being discharged from blades 52 the outgoing fluid then enters an annular portion of outlet port means 18 as defined between webs 39 and 41. Due to the shifting of spool 22 shoulder 70 has now moved over sufficiently far to the right so that outgoing fluid from the motor is in direct communication with the outlet port 18. As can be seen from the foregoing the turbine motor-pump can then act as a pressure converter to change the high volume-low pressure incoming flow into a high pressure-low volume flow in that portion which is discharged into cylinder 14. Shortly after the spool 22 shifts a considerable portion of the fluid may be diverted into the cylinder 14. However, as the back pressure increases, that volume will be reduced, forcing a greater proportion of the fluid through the motor 50–52. This has the effect of running the turbine faster and thus increasing the pressure output of the pump blades 58–60. If additional pressure is needed it can be obtained by increasing the number of stages in either or both of the motor or pump. A two-stage motor and a four-stage pump have been used here only for purposes of illustration. When the back pressure in cylinder 14 decreases to less than that from incoming pressure from pump P the spring 28 will then return the spool 22 to the position shown in FIG. 3. The speed of the return movement is also controlled by the dashpot 34 because the area 72 between the web 39 and cylinder ring 36 is filled with fluid due to the clearance 74 between the extension 33 and the web 39. This clearance 74 acts in a manner similar to the orifice 48 to control the speed of the spool shifter, the greater the clearance, the faster the return shift can take place.

As can be seen the foregoing there are no check valves or other components in the high pressure part of the system. High pressure exists only between the pump blades and the cylinder itself thus eliminating a major source of possible difficulty in construction and maintainence of a fluid boosted pressure system.

Figure 9:
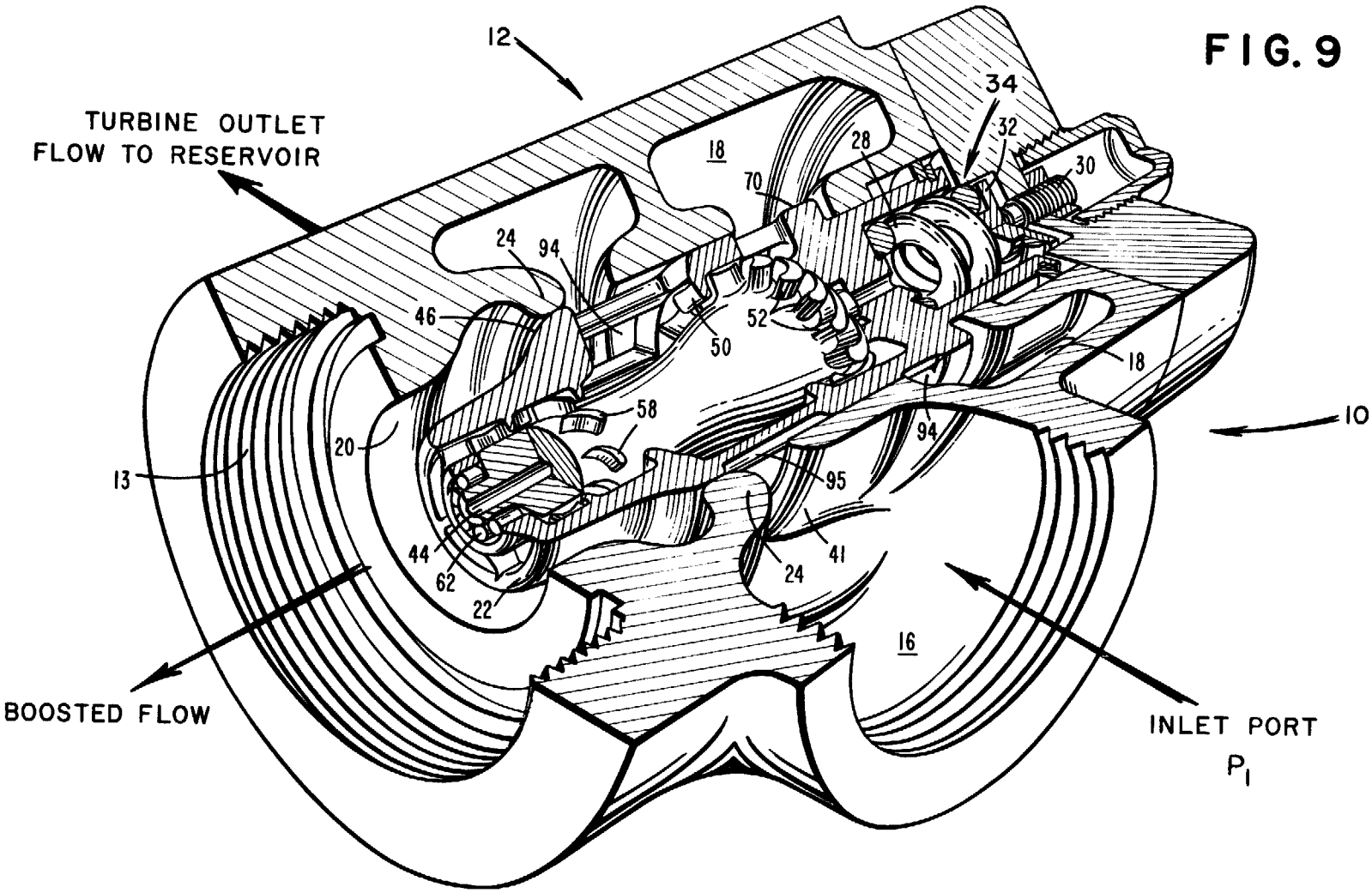
FIG. 9 is a perspective view, partly in section, of the booster shown in FIGS. 3 and 4.

FIG. 9 better illustrates the construction of spool 22 showing it shifted to the same active position as in FIG. 4, with the flow path through the spool to rotate the turbine motor-pump. As shown in FIG. 9 the spool has a plurality of openings 94 between webs 95 for the passage of fluid into and out of the spool. The spool is constructed to be opened up along either an axial or longitudinal joint for insertion or servicing of the turbine and its blades or bearings.

Turning now to FIGS. 5 through 8, FIG. 5 is a sectional view similar to FIG. 3 but taken at 90° thereto so that the inlet and outlet port means of the body are not shown but to give a better idea of the remainder of the body 12. FIGS. 5–8 also illustrate an alternative form of pressure converter using a volumetic pump and motor such as a gear motor-pump rather than a turbine. Only parts which are different will be separately described.

The operation of the spool—to shift in response to a pressure build up in the cylinder—remains the same as does the arrangement of inlet and outlet ports and passages with the spool acting as a sliding valve to control the flow of fluid through them.

Figure 5:
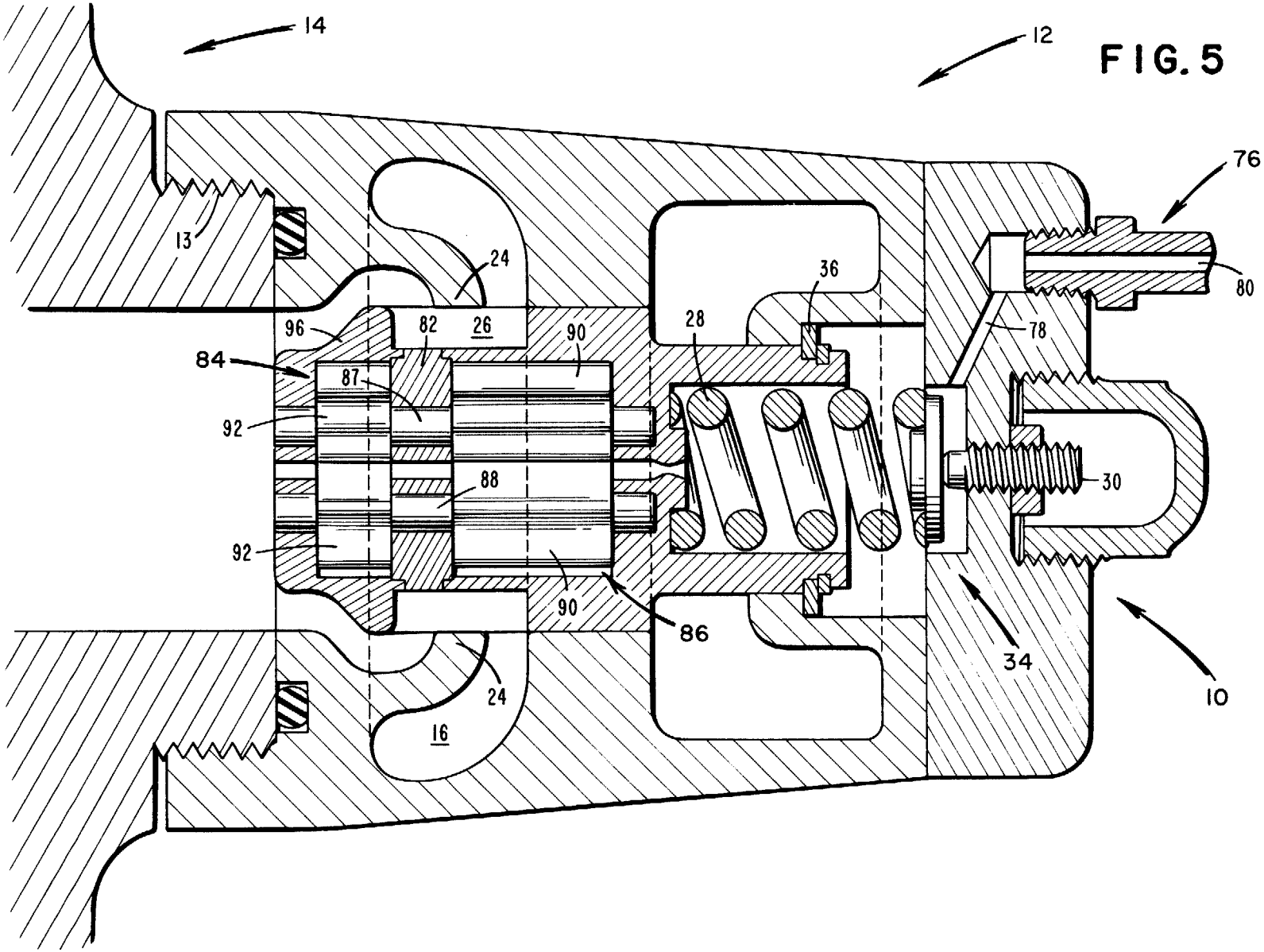
FIG. 5 is a sectional view similar to FIG. 3 but illustrating the use of a gear motor-pump as the pressure converter.

The operation of the dashpot also remains the same; FIG. 5 includes illustration of an optional cylinder pressure signal 76 which has a passageway 78 to conduct fluid under pressure through a conduit 80 to a pressure gauge, signal device or pressure control valve to remotely control bleeding of dash-pot 34 to shift spool. This pressure signal may be also used with the embodiment of FIGS. 3–4.

Figure 6:
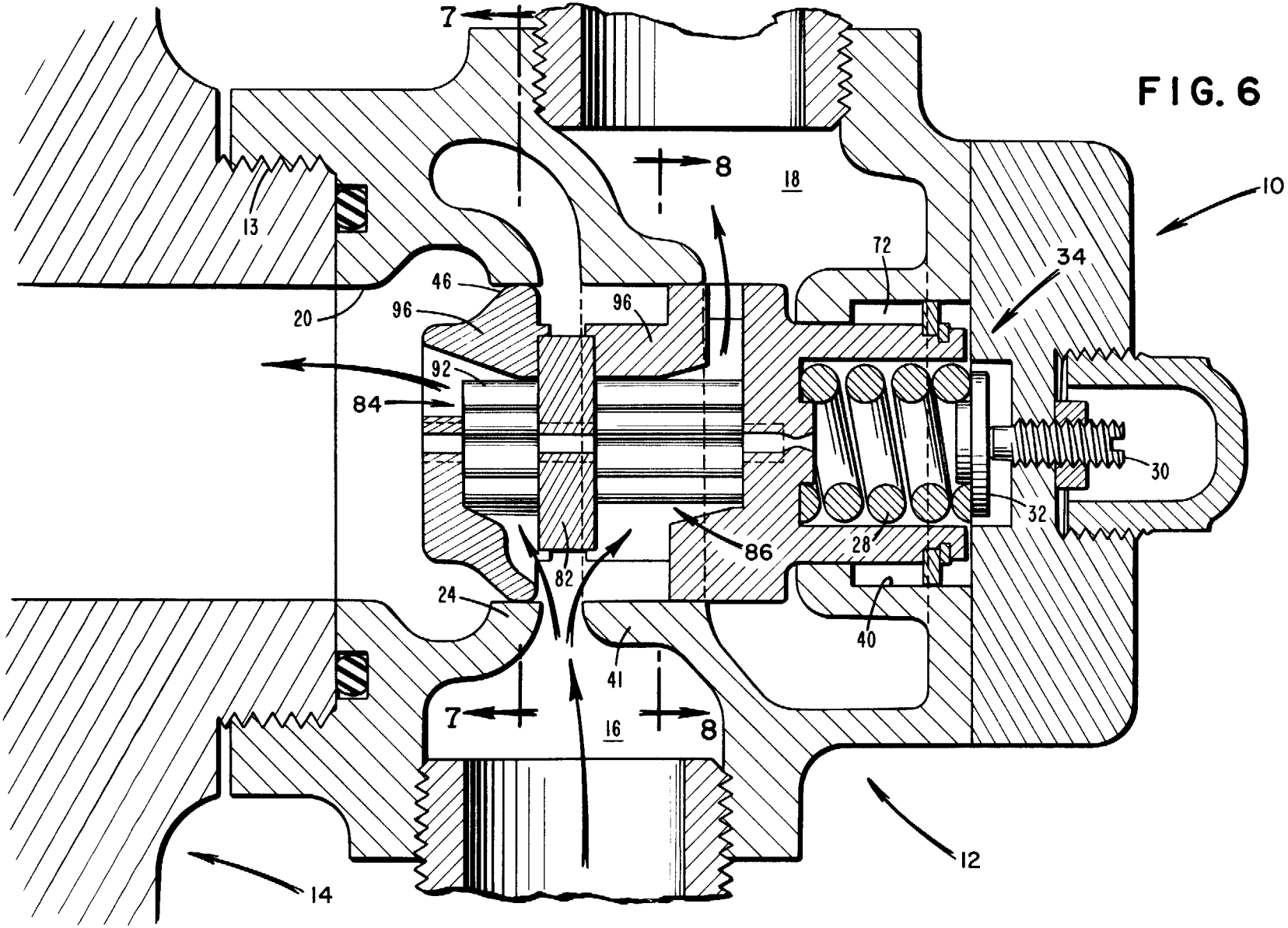
FIG. 6 is a sectional view similar to FIG. 4 but illustrating the use of a gear motor-pump as the pressure converter.
Figure 8:
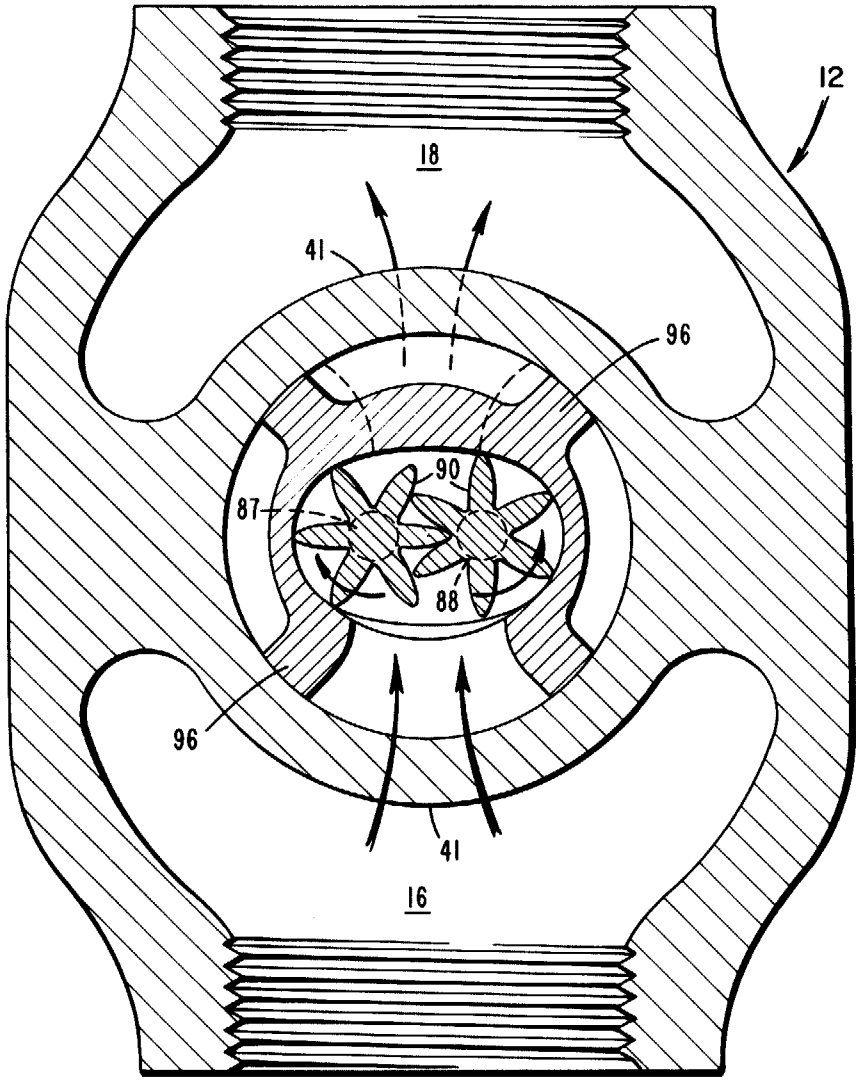
FIG. 8 is a sectional view taken along line 8—8 of FIG. 6.
Figure 7:
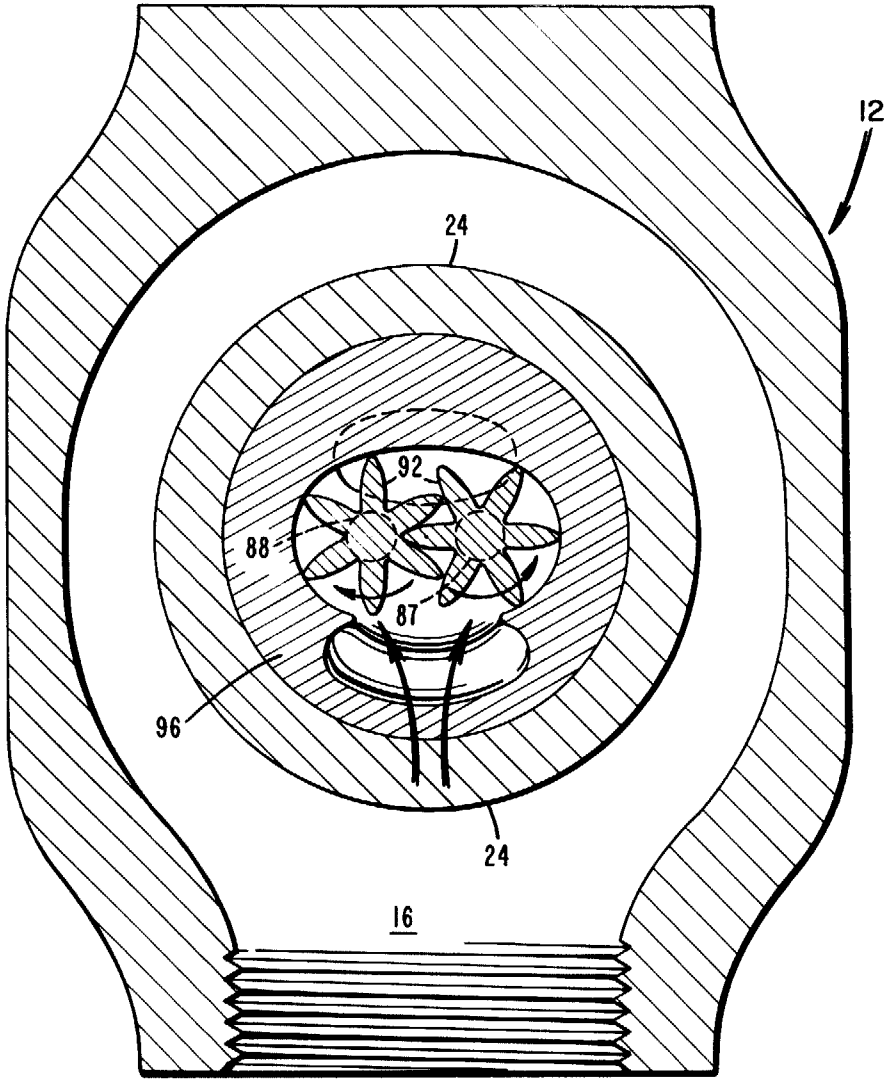
FIG. 7 is a sectional view taken along line 7—7 of FIG. 6.

In the gear motor-pump pressure converter incoming fluid enters inlet port means 16 of body 12 and in FIG. 5 by-passes the spool in the same manner as in FIG. 3. After sufficient pressure buildup in cylinder 14 the back pressure will cause the spool to shift to the position shown in FIG. 6. In FIG. 6 the incoming fluid flow is divided with part of it going to the left of partition 82 to gear pump 84 and part of it going to the right of partition 82 to gear motor 86. The fluid flow through the gear motor causes rotation of gears 90 which in turn rotate shafts 86 and 87. These shafts extend through partition 82 and support pump gears 92 for rotation as shown in FIG. 7. That portion of the fluid which goes into the pump is then increased in pressure through the action of the pump and then discharged into cylinder 14. The passages of the motor and of the pump are of conventional construction to direct the fluid through the housing 96, around the gears and into the outlet port means 18 in the case of fluid going to the motor or into the mechanism 14 in the case of fluid going to the pump.

The volumetric motor-pump is advantageous over the turbine for holding a hydraulic ram in an extended position with a minimum amount of fluid flow to it during the holding operation due to the fact that it is very difficult for any fluid to flow backward through a gear pump or motor. To insure a positive hold a check valve (not shown) would be used in the inlet port means. To achieve higher pressure and tighter holding it is contemplated that another type of volumetric motor-pump such as a piston motor and pump combination could be used. It is to be noted that the check valve while only retaining pressure A at the inlet port, is insuring full boosted pressure holding at the mechanism or motor port.

Volumetric motors and pumps would be mostly used for lower boosting volume needs and when the basic hydraulic system flow must be diverted partially or completely to other tasks while the high pressure is maintained in the mechanism 14. The turbine type motor and pump will be preferable when the full power of the basic system has to be converted to higher pressure to achieve maximum work output by the mechanism under high boosted pressure conditions.

Cascades of two or more self-monitored boosters can be connected in series so that the over all system can be used more efficiently in the intermediate pressure range between the low basic system pressure and the maximum boosted pressure.

It is also contemplated that the spool could be a different type of sliding means such as a poppet valve assembly having a frusto-conical seat to effect the sealing between the sliding means or spool and the body.

Although various specific embodiments have been described in detail to teach those skilled in the art to use this invention, they are by way of example only, and the scope of the invention is defined by the following claims.

I claim:

1. A self-monitored fluid pressure booster device comprising:

a. a body having a bore connectable to a fluid pressure operated mechanism and inlet port means and outlet port means connected to the bore;

b. a shiftable sliding means in the bore having means to control fluid flow to and from said outlet and inlet port means in response to pressure in the fluid operated mechanism;

c. pressure converter means associated with said sliding means to convert a high volume low pressure fluid flow into a low volume high pressure flow;

d. said sliding means being mounted to shift from a first position in which the fluid control means directs the fluid flow from the inlet port into the mechanism to a second position in which the fluid control means directs the fluid flow from the inlet port through the pressure converter means to the mechanism and the outlet port means.

2. The device of claim 1 including means to return the sliding means from said second position to said first position.

3. The device of claim 2 in which the pressure converter means has a fluid passage therethrough to interconnect the return means with the area of boosted pressure.

4. The device of claim 2 in which the return means is biased to operate in response to a change in pressure in the fluid operated mechanism.

5. The device of claim 2 in which the return means is a spring and dashpot means cooperating with one end of the sliding means.

6. The device of claim 1 in which the pressure converter means is a turbine type pump and motor.

7. The device of claim 1 in which the pressure converter means is a volumetric type pump and motor.

8. The device of claim 7 in which the volumetric pump and motor are a gear pump and motor.

9. A self-monitored fluid pressure booster device comprising:

a. a body having a bore with connection means at one end for connection to a fluid pressure operated mechanism, inlet port means and outlet port means in the body axially spaced along and communicating with the bore;

b. a shiftable sliding means in the bore having pressure converter means mounted therein the pressure converter means having a motor and pump, the sliding means having an outlet passage from the motor, a discharge passage communicating the pump to said connection means and an inlet passage connected to the motor and the pump;

c. said sliding means being mounted for axial shifting along the bore from a first inactive position in which the inlet port means is connected for fluid to flow directly to the mechanism and the outlet passage are blocked to a second active position in which the inlet port means is aligned with the inlet passage and the outlet port means is aligned with the outlet passage so that fluid pressure in the inlet port means will cause fluid to flow through the inlet passage to both the motor and the pump, the motor driving the pump to create a zone of boosted pressure in the discharge passage, the shifting of the sliding means being a response to the pressure in said zone.

10. The device of claim 9 including means to return the sliding means from said second position to said first position.

11. The device of claim 10 in which the pressure converter means has a fluid passage therethrough to interconnect the return means with the area of boosted pressure.

12. The device of claim 10 in which the return means is biased to operate in response to a change in pressure in the fluid operated mechanism.

13. The device of claim 10 in which the return means is a spring and dashpot means cooperating with one end of the sliding means.

14. The device of claim 9 in which the pressure converter means is a turbine type pump and motor.

15. The device of claim 9 in which the pressure converter means is a volumetric type pump and motor.

16. The device of claim 15 in which the volumetric type pump and motor is a gear pump and motor.

17. A self-monitored fluid pressure booster device comprising:

a. a body having a circular bore with one end being open to present connection means to attach the body to a fluid pressure operated mechanism, an inlet port and an outlet port in the body axially spaced along and communicating with the bore;

b. a cylindrical sliding means in the bore mounted for axial shifting, a pressure converter in the sliding means having a fluid operated motor directly connected to a fluid pump, an outlet passage from the motor, a discharge passage from the pump to the area of the connection means and an inlet passage connected to both the motor and the pump;

c. a first shoulder on the sliding means adjacent the inlet passage and a second shoulder on the sliding means adjacent the outlet passage;

d. the inlet and outlet ports in the body being positioned in relation to said shoulders so that in a first axially shifted position the first shoulder permits passage of fluid directly from the inlet port to the area of the connection means and the second shoulder blocks off the outlet passage and in a second axially shifted position the first shoulder blocks off direct fluid flow from the inlet port to the area of the connection means, directing the fluid flow from the inlet port to the inlet passage of the sliding means and the second shoulder is positioned to permit fluid flow from the outlet passage of the sliding means to the outlet port of the body;

e. a cylindrical extension from the sliding means on the end opposite the pump, said extension being of smaller diameter than said first shoulder;

f. a cylindrical cavity in the body positioned to receive said extension therein;

g. sealing means between said extension and said cavity to define a dashpot to dampen the shifting of the sliding means;

h. biasing means in said dashpot tending to return the sliding means to said first position upon a decrease in pressure in the area of said connection means.

18. The device of claim 17 in which the pressure converter means is a turbine type pump and motor.

19. The device of claim 17 in which the pressure converter means is a volumetric type pump and motor.

20. The device of claim 19 in which the volumetric type pump and motor is a gear pump and motor.

21. The device of claim 1 in which the pressure converter means is located within said shiftable sliding means.

*22. The device of claim 1 in which the fluid flow in said second position passes directly from said inlet port means to said pressure converter means.*

*23. A fluid pressure operated system comprising:*

*pump means to supply a fluid flow under a low pressure and a high volume;*

*a fluid operated mechanism;*

*a self monitored fluid pressure booster device in communication with said pump and said mechanism, said device comprising:*

*a body having a bore in direct fluid communication with said fluid pressure operated mechanism; inlet port means connected to the pump means, and outlet port means,*

*a shiftable sliding means for controlling fluid flow from said inlet port means;*

*pressure converter means associated with said sliding means to convert said low pressure - high volume fluid flow to a high pressure - low volume fluid flow; said sliding means being mounted to shift in response to pressure in the operated mechanism from a first position in which the means for controlling the fluid flow permits a free flow of the fluid from the inlet port into and out of the operated mechanism to a second position in which the means for controlling the fluid flow directs a portion of the fluid flow from the inlet port through the pressure converter means directly to the mechanism, and another portion to the outlet port means; said converter means being connected directly to said operated mechanism so that only said booster*

*device and the operated mechanism are subjected to said high pressure - low volume flow.*

*24. The system of claim 23 in which the shiftable sliding means is itself shaped to provide means for controlling the fluid flow.*

*25. The system of claim 23 including a reservoir, and a 3 way directional control valve interposed between the pump and the booster device and connected to said reservoir so that in a first position fluid is fed directly from the pump, through the valve to the booster device, and in a second position fluid flow from the pump to the booster is cut off and the booster device is communicated to the reservoir.*

*26. The system of claim 25 including means connecting the directional control valve to the opposite end of the fluid operated mechanism and wherein in said second position said pump is communicated with said opposite end of the fluid operated mechanism.*

* * * * *